(12) United States Patent
Sasaki et al.

(10) Patent No.: US 7,556,681 B2
(45) Date of Patent: Jul. 7, 2009

(54) INK FOR INK-JET RECORDING

(75) Inventors: Kunitsuna Sasaki, Tokyo (JP); Hirotaka Iijima, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 12/112,208

(22) Filed: Apr. 30, 2008

(65) Prior Publication Data

US 2008/0276833 A1    Nov. 13, 2008

(30) Foreign Application Priority Data

May 7, 2007   (JP) .............................. 2007-122151
Apr. 4, 2008  (JP) .............................. 2008-098076

(51) Int. Cl.
   *C09D 11/02* (2006.01)
(52) U.S. Cl. ................................ 106/31.58; 106/31.86
(58) Field of Classification Search .............. 106/31.58, 106/31.86
   See application file for complete search history.

(56) References Cited

U.S. PATENT DOCUMENTS

| | | | | |
|---|---|---|---|---|
| 4,176,361 A | * | 11/1979 | Kawada et al. | 106/31.58 |
| 4,381,946 A | * | 5/1983 | Uehara et al. | 106/31.58 |
| 5,207,824 A | * | 5/1993 | Moffatt et al. | 106/31.58 |
| 5,431,724 A | * | 7/1995 | Adamic et al. | 106/31.58 |
| 6,497,479 B1 | * | 12/2002 | Stoffel et al. | 347/100 |
| 7,163,577 B2 | * | 1/2007 | Tyrell | 106/31.86 |
| 2003/0195274 A1 | * | 10/2003 | Nakamura et al. | 523/160 |
| 2004/0242726 A1 | * | 12/2004 | Waki et al. | 523/160 |
| 2005/0075449 A1 | * | 4/2005 | Kubota | 524/588 |
| 2006/0065155 A1 | * | 3/2006 | Byers et al. | 106/31.43 |

FOREIGN PATENT DOCUMENTS

EP    1041127    10/2000

* cited by examiner

*Primary Examiner*—Helene Klemanski
(74) *Attorney, Agent, or Firm*—Lucas & Mercanti, LLP

(57) ABSTRACT

An ink-jet ink comprising at least water and an organic solvent having a boiling point of not less than 150° C. in an amount of not less than 50 weight % and not more than 80 weight % based on the total weight of the ink, wherein the organic solvent comprises an alkane diol represented by Formula (1) or (2) in an amount of not less than 45 weight % and not more than 70 weight % based on the total weight of the ink, and a glycol mono-ether represented by Formula (3) in an amount of not less than 5 weight % and not more than 15 weight % based on the total weight of the ink: Formula (1) $R_1$—CH(OH)—CH(OH)—$R_2$; Formula (2) $R_1$—CH(OH)—$CH_2$—CH(OH)—$R_2$; Formula (3) $CH_3$—O—$R_3$—OH.

3 Claims, No Drawings

INK FOR INK-JET RECORDING

This application is based on Japanese Patent Application Nos. 2007-122151 filed on May 7, 2007, and 2008-98076 filed on Apr. 4, 2008, in Japanese Patent Office, the entire content of which is hereby incorporated by reference.

TECHNICAL FIELD

The present invention relates to an ink for ink-jet recording.

BACKGROUND

In recent years, since ink-jet recording enables simple and less expensive formation of images, it has been applied to various printing fields such as photography, various types of printing, marking, and special printing such as color filters. Specifically, by employing ink-jet recording apparatuses which eject and control minute ink droplets, ink-jet inks whose range of color reproduction, durability, and ejection adaptability have been enhanced, and paper or media for ink-jet printing use whose ink-absorbability, color forming properties of colorants and surface glossiness have also been markedly enhanced, it has become possible to provide image quality comparable to conventional silver halide photography.

However, the ink-jet image recording system which requires special paper or media for ink-jet printing use causes problems such as restriction of recording media usable in the system, and a subsequent cost increase in the recording media.

On the other hand, in the offices, needs for a system which enables high-speed full-color printing employing plain paper has been increasing. Further, with regard to composition of ink-jet ink, various studies have been undertaken with regard to factors such as high-speed printintability, excellent reproducibility of text on plain paper, minimal rear surface penetration (a phenomenon in which the printed ink penetrates through the recording medium to result in appearance of the printed image on the reverse surface of the recording medium), inhibition of curling, more rapid penetration of ink into the paper and quick dryability (as described in, for example, Patent Documents 1 and 2).

With regard to the above problems, the inventors found an ink which enables to simultaneously prevent both the curling and the rear surface penetration by employing an ink-jet ink composed of, as solvents, a small amount of water and a large amount of a specific high boiling organic solvent, whereas solvents used for a conventional water-based ink-jet ink are composed of a small amount of high boiling organic solvent and a large amount of water (as described in, for example, Patent Documents 3-6). In particular, a monool having one hydroxyl group is preferable as the high-boiling organic solvent.

However, it was found that when prints printed with an ink of the invention are kept in piles with electrophotographic prints, mutual adhesion of electrophotographic prints may occur. For the reason of the adhesion, it was found that since the ink of this invention incorporates much more high boiling organic solvent than common water-based inks, the ink tend to remain in paper, dissolving electrophotographic toners.

Patent Document 1: Unexamined Japanese Patent Application Publication No. (hereinafter, referred to as JP-A) 2004-217930

Patent Document 2: JP-A 2005-193660

Patent Document 3: JP-A 2005-220218

Patent Document 4: JP-A 2005-220296

Patent Document 5: JP-A 2005-220297

Patent Document 6: JP-A 2005-220298

Patent Document 7: JP-A 2001-322275

SUMMARY OF THE INVENTION

Issues to be Solved by the Invention

An object of the present invention is to provide inks for ink-jet recording which prevent rear surface penetration in plain paper recording, do not cause mutual adhesion of electrophotographic prints even when ink-jet prints and electrophotographic prints are stored in piles, and suppress curling of prints under high-humidity condition.

Means to Solve the Issues

The object of the present invention can be achieved with the constitution described below.

Item 1. An ink-jet ink comprising at least water and an organic solvent having a boiling point of not less than 150° C. in an amount of not less than 50 weight % and not more than 80 weight % based on the total weight of the ink, wherein the organic solvent comprises an alkane diol represented by following Formula (1) or (2) in an amount of not less than 45 weight % and not more than 70 weight % based on the total weight of the ink and a glycol mono-ether represented by the following Formula (3) in an amount of not less than 5 weight % and not more than 15 weight % based on the total weight of the ink.

  Formula (1)

wherein $R_1$ is a hydrogen atom or a methyl group, $R_2$ is a hydrogen atom or a methyl group, an ethyl group, or a propyl group;

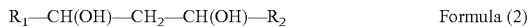  Formula (2)

wherein $R_1$ is a hydrogen atom or a methyl group, $R_2$ is a hydrogen atom or a methyl group, an ethyl group, or a propyl group;

  Formula (3)

wherein $R_3$ is a branched-chain bivalent saturated hydrocarbon group.

Item 2. The ink-jet ink as described in Item 1 above, wherein the alkane diol represented by the above-described Formula (1) or (2) is selected from 1,2-butanediol, 1,2-pentanediol, and 1,2-hexanediol; and the glycol mono-ether represented by the above-described Formula (3) is 3-methoxy-3-methyl-butanol.

Item 3. An ink-jet ink comprising at least water and an organic solvent having a boiling point of not less than 150° C. in an amount of not less than 50 weight % and not more than 80 weight % based on the total weight of the ink, wherein the organic solvent comprises an alkane diol represented by following Formula (1) or (2) in an amount of not less than 45 weight % and not more than 70 weight % based on the total weight of the ink and a glycol mono-ether represented by the following Formula (3) in an amount of not less than 5 weight % and not more than 15 weight % based on the total weight of the ink.

  Formula (1)

wherein $R_1$ is a hydrogen atom or a methyl group, $R_2$ is a hydrogen atom or a methyl group, or an ethyl group;

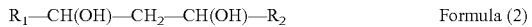  Formula (2)

wherein $R_1$ is a hydrogen atom or a methyl group, $R_2$ is a hydrogen atom or a methyl group, or an ethyl group;

$CH_3-O-R_3-OH$      Formula (3)

wherein $R_3$ is a branched-chain bivalent saturated hydrocarbon group.

SUMMARY OF THE INVENTION

An object of the present invention is to provide an ink-jet ink whereby the ink prevents rear surface penetration in plain paper recording and mutual adhesion of electrophotographic prints even when ink-jet prints and electrophotographic prints are stored in piles, and suppresses curling of prints under high-humidity conditions.

DETAILED DESCRIPTION OF THE PREFERRED EMBODIMENTS

The present invention is detailed below.

An electrophotographic toner can be classified as either a crushed toner or a polymerized toner. As materials thereof, a stylene/acryl resin or a polyester resin is generally used. The inventors studied about solubilization of a toner by a high boiling organic solvent, and as a result, found that a diol, as a high boiling organic solvent, resulted in less solubilization of a toner compared to a monool.

It is assumed to be due to the polarity of a monool being closer to that of a toner compared to a diol. However, in general, a curling property of prints printed on plain paper with inks comprising a diol is inferior compared to inks comprising a monool. The curling occurs by a mechanism that hydrogen bonding by hydroxyl groups of cellulose of paper is broken and hydrogen bonding takes place at other place after swelling. A monool easily blocks the broken hydroxyl group of the cellulose, resulting in decreasing curling, while a diol does not have such a mechanism.

However, it was found that employing an alkane diol, among diols, represented by either the above-described Formula (1) or (2), or both resulted in less curling of prints, as well as low solubilization of a toner.

The reason for the above may be that since the two hydroxyl groups of the above alkane diol are closely located in its molecule, a suitable bias of polarity in a molecule tends to more easily block the hydroxyl groups of cellulose which was broken by swelling compared to an alkane diol which have two hydroxyl groups at, for example, both ends of the molecule.

Through the study as described above, the inventors found an ink which, in plain paper recordings, prevent curing and rear surface penetration, and, in addition, do not cause mutual adhesion of electrophotographic prints even when ink-jet prints and electrophotographic prints are kept in piles. However, through further study of various storage conditions, the inventors found that anti-curling effect is insufficient when the prints are stored under significantly high-humidity conditions.

It is assumed that the above result is due to a high hygroscopicity of the alkane diol which has two hydroxyl groups. Then, as a result of the further study, the inventors found that an addition of a glycol mono-ether represented by the above-described Formula (3) in the ink exhibits sufficient effect for the curling under high-humidity conditions in an amount of not more than 15 weight % in combinations of an alkane diol of the invention in an amount of not less than 45 weight %. The presumed mechanism is attributable to an intramolecular polarity due to branched hydrocarbons. Simultaneously, it was found that the alkane diol does not cause a practical problem in the solubilization of toner as long as used at an amount falling within the above range.

<<Solvent>>

An ink-jet ink (hereinafter, referred to also as simply an ink) comprising at least water and an organic solvent having a boiling point of not less than 150° C. in an amount of not less than 50 weight % and not more than 80 weight % of the ink, wherein the organic solvent comprises at least an alkane diol represented by following Formula (1) or (2) in an amount of not less than 45 weight % and not more than 70 weight % of the ink, and a glycol mono-ether represented by following Formula (3) in an amount of not less than 5 weight % and not more than 15 weight % of the ink.

The inventors have already found that it is possible to simultaneously achieve both decreased print curling of plain paper and less rear surface penetration by employing an optimum content of an organic solvent having a boiling point of not less than 150° C. A higher ratio of the organic solvent having a boiling point of not less than 150° C. decreases the print curling. On the contrary, a lower ratio of the organic solvent having a boiling point of not less than 150° C. minimizes the rear surface penetration.

Further, it was found that an ink containing an organic solvent having the boiling point of not less than 150° C. in an amount of not less than 50 weight % and not more than 80 weight % based on the total weight of the ink, and a glycol mono-ether represented by the above-described Formula (3) in an amount of not less than 5 weight % and not more than 15 weight % of the ink results in achieving less curling of plain paper prints under high-humidity conditions, as well as less rear surface penetration.

Specific examples of the alkane diol represented by the Formulas (1) and (2) include 1,2-propanediol, 1,2-butanediol, 1,2-pentanediol, 2,3-butanediol, 2,3-pentanediol, 2,3-hexanediol, 1,3-butanediol, 2,4-pentanediol, and 1,2-hexanediol. Further, of the alkane diols represented by the Formulas (1) and (2), preferable are selected ones from 1,2-butanediol, 1,2-pentanediol, and 1,2-hexanediol, since a viscosity increase of these compounds is small when water is evaporated, resulting in more preferable decap performance while ejecting inks.

Specific examples of the glycol monoether represented by the Formula (3) include 3-methoxy-3-methylbutanol, 3-methoxybutanol, and 2-methoxypropanol. Further, among the glycol monoethers represented by Formula (3), the 3-methoxy-3-methylbutanol exhibits further curling decreasing effect since the compound has two methyl groups at third carbon atom.

An ink containing the above alkane diol in an amount of not less than 45 weight % and not more than 70 weight % of the ink, and the above glycol monoether in an amount of not less than 5 weight % and not more than 15 weight % of the ink results in achieving less curling of plain paper prints under high-humidity conditions, and less rear surface penetration, as well as less solubilization of a toner. The amount of water can be calculated by subtracting the amounts of organic solvent having the boiling point of not less than 150° C. and solids such as pigments and dispersing agents from the amount of the ink. The amount of water of the invention is not less than 10 weight % and not more than 50 weight % of the ink. Curling and rear surface penetration are influenced by the amount of water. A larger amount of water further improves rear surface penetration, while further deteriorating curling.

<<Colorant>>

The ink of the present invention incorporates colorants. Colorants used in the present invention, preferably include, for example, yellow, magenta, cyan, black, green or red colorants. Of these, yellow, magenta, cyan, and black colorants are particularly preferred.

The ink of the present invention may be applied to various types of ink-jet inks such as a dye ink which employs dyes as a colorant, a pigment ink whose colorants are insoluble in the solvents constituting the ink-jet ink and which forms a dispersion containing minute pigment particles, or a dispersion ink which is composed of a dispersion of a polymer colored with a colorant.

A dye usable in the present invention includes an azo dyes, a methine dye, an azomethine dye, a xanthene dye, a quinone dye, a phthalocyanine dye, a triphenylmethane dye, and a diphenylmethane dye. As a specific compound, for example, dyes exemplified in JP-A 2002-264490 may be cited.

Further, an oil-soluble dye which forms minute colored particles together with a polymer to become a colorant is usually selected from dyes such as dispersed dyes which are soluble in an organic solvent having no water-soluble group such as carboxylic acid or sulfonic acid, but are insoluble in water. Further, dyes which are prepared in such a manner that water-soluble dyes are modified to be oil-soluble ones through formation of salts with long chain bases are also included. For example, dyes such as acid dyes, direct dyes, or reactive dyes which form salts with long chain amines are known.

However, in the ink of the present invention, a pigment is preferably employed as a colorant, and a pigment which is insoluble in the composition of the solvent of the present invention is more preferable to permit the pigment to sufficiently exhibit the targeted effects which are an object of the invention.

Examples of the pigment usable in the present invention include those commonly known without any limitation, and either a water-dispersible pigment or an oil-dispersible pigment is usable. For example, an organic pigment such as an insoluble pigment or a lake pigment, as well as an inorganic pigment such as carbon black, is preferably usable. The pigment is allowed to be present as a dispersed state in a water-soluble ink. As a dispersion method of the pigment, any one of self-dispersion, surfactant dispersion, polymer dispersion and microcapsule dispersion is applicable, but polymer dispersion or microcapsule dispersion is preferable in terms of fixability.

Examples of the insoluble pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or a diketopyrrolopyrrole dye.

Specific pigments which are preferably usable are listed below.

Examples of pigments for magenta or red include: C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 44, C.I. Pigment Red 149, C.I. Pigment Red 166, C.I. Pigment Red 177, C.I. Pigment Red 178, and C.I. Pigment Red 222.

Examples of pigments for orange or yellow include: C.I. Pigment Orange 31, C.I. Pigment Orange 34, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 74, C.I. Pigment Yellow 93, C.I. Pigment Yellow 128, C.I. Pigment Yellow 94, and C.I. Pigment Yellow 138.

Examples of pigments for green or cyan include: C.I. Pigment Blue 15, C.I. Pigment Blue 15:2, C.I. Pigment Blue 15:3, C.I. Pigment Blue 16, C.I. Pigment Blue 60, C.I. and C.I. Pigment Green 7.

In addition to the above pigments, when red, green, blue or intermediate colors are required, it is preferable that the following pigments are employed individually or in combinations thereof. Examples of employable pigments include: C.I. Pigment Red 209, 224, 177, and 194, C.I. Pigment Orange 43, C.I. Vat Violet 3, C.I. Pigment Violet 19, 23, and 37, C.I. Pigment Green 36, and 7, C.I. Pigment Blue 15:6.

Further, examples of pigments for black include: C.I. Pigment Black 1, C.I. Pigment Black 6, and C.I. Pigment Black 7.

The average particle size in the pigment dispersion employed in the ink of this invention is preferably not less than 50 nm and not more than 200 nm. When the average particle diameter in the pigment dispersion is less than 50 nm or more than 200 nm, the pigment dispersion becomes unstable, whereby storage stability of the ink is easily deteriorated.

The average particle size can be determined employing commercially available particle size measuring apparatuses using a dynamic light scattering method or an electrophoretic method. Of these, a dynamic light scattering method is frequently used for measurement, since the operation of the method is simple and accuracy of the measurement in the range of the particle size is high.

It is preferable that the pigment used in the invention is dispersed employing a homogenizer together with a dispersing agent and necessary additives for various desired purposes. Commonly known homogenizers are usable, including a ball mill, a sand mill, a line mill, or a high pressure homogenizer. Of these, dispersion using a sand mill is preferable since a sharp distribution of particle size is achieved when the dispersion is carried out with targeting the average particle size to be about 100 nm. As bead materials used for sand mill dispersion, zirconia or zircon is preferable considering contamination of bead fragments or ionic constituents. Further, the bead size of not less than 0.1 mm and not more than 0.5 mm is preferable.

<<Pigment Dispersing Agent>>

A high molecular weight dispersing agent used for dispersion of a pigment of this invention includes, for example, a surface active agent such as a higher fatty acid salt, an alkyl sulfate salt, an alkyl ester sulfate salt, an alkyl sulfonate salt, a sulfosuccinate salt, a naphthalene sulfonate salt, an alkyl phosphate salt, a polyoxyalkylenealkylether phosphate salt, a polyoxyalkylenealkylphenyl ether, a polyoxyethylenepolyoxypropylene glycol, a glycerin ester, a sorbitan ester, a polyoxyethylene fatty acid amide and an amine oxide. Further, listed are a block copolymer, a random copolymer or salts thereof, which is comprised of at least two monomers selected from stylene, a stylene derivative, a vinylnaphthalene derivative, acrylic acid, an acrylic acid derivative, maleic acid, a maleic acid derivative, itaconic acid, an itaconic acid derivative, fumaric acid, and a fumaric acid derivative.

In this invention, the pigment dispersing agent is preferably employed at 10-100 weight % based on the total weight of the pigment.

<<Surface Active Agent>>

In dispersion of the pigment of this invention, a surface active agent may be employed as an additive. Any of cationic, anionic, amphoteric, or nonionic surface active agent as a surface active agent are usable in this invention. Of these, a nonionic surface active agent is particularly preferable in view of dispersion stability.

A nonionic surface active agent includes, for examples, polyoxyethylene secondary alcohol ether, polyoxyethylene alkyl phenyl ether, polyoxyethylene sterol ether, polyoxyethylene lanolin derivatives, polyoxyethylene polyoxypropylene alkyl ether, polyoxyethylene glycerin fatty acid ester, polyoxyethylene castor oil, hardened castor oil, polyoxyethylene sorbitol fatty acid ester, polyethylene glycol fatty acid ester, fatty acid monoglyceride, polyglycerin fatty acid ester, sorbitan fatty acid ester, propylene glycol fatty acid ester, sucrose fatty acid ester, fatty acid alkanolamide, polyoxyethylene fatty acid amide, polyoxyethylene alkylamine, alkylamine oxide, acetylene glycol, and acetylene alcohol.

To accelerate penetration of ink droplets into plain paper after ink ejection, it is preferable to use a surface active agent. The above surface active agents are not limited as long as not adversely affecting properties of the ink such as storage stability. As such a surface active agent, the same ones which are used as an additive during the aforesaid dispersion may be employed.

<<Polyvalent Metal Ion>>

The total content of a calcium ion, a magnesium ion, and an iron ion, all of which are multivalent metal ions, in the ink of the present invention, is preferably not more than 10 ppm, more preferably 0.1-5 ppm, and still more preferably 0.1-1 ppm.

Addition of multivalent metal ions of the above specified amount in an ink-jet ink provides an ink having high dispersion stability. The multivalent metal ions of the present invention are incorporated in the form of sulfates, chlorides, nitrates, acetates, organic ammonium salts, and EDTA salts.

<<Other Additives>>

In response to purposes to enhance various properties such as ejection stability, adaptability to printing heads and ink cartridges, storage stability, and image retention properties, it is possible, if needed, to appropriately select and employ various types of commonly known additives in the ink of the invention other than those described above. Included are additives such as polysaccharides, a viscosity modifier, a specific resistance controlling agent, a film forming agent, an UV absorbing agent, an antioxidant, an anti-discoloring agent, an antiseptic agent, or an anti-rusting agent.

Examples thereof include minute oil droplets of liquid paraffin, dioctyl phthalate, tricresyl phosphate, or silicone oil; UV absorbing agents described in JP-A Nos. 57-74193, 57-87988, and 62-261476; anti-discoloring agents described in JP-A Nos. 57-74192, 57-87989, 60-72785, 61-146591, 1-95001, and 3-13376, as well as optical brightening agents described in JP-A Nos. 59-42993, 59-52689, 62-280069, 61-242871, and 4-219266.

A dissolved oxygen density in the ink of this invention is preferably not more than 2 ppm at 25° C. The above dissolved oxygen density can suppress formation of air bubbles, thereby realizing an ink-jet recording system having excellent ejection stability even in a high-speed printing. The density of oxygen dissolved in an ink may be measured employing, for example, Dissolved Oxygen Meter DO-14P (manufactured by To a Denpa Kogyo Co.).

<<Recording Method>>

In the image recording method employing the ink-jet ink of this invention, ink-jet prints are formed in such a manner that, employing an ink-jet printer loaded with ink-jet inks, ink droplets are ejected from the ink-jet heads on the basis of digital signals and attached onto a plain paper.

In image formation by ejecting the ink of this invention, an ink-jet head of either an on-demand system or a continuous system may be employed. As an ink ejection system, there may be usable either the electric-mechanical conversion system (e.g., a single-cavity type, a double-cavity type, a bender type, a piston type, a share mode type, or a shared wall type), or an electric-thermal conversion system (e.g., a thermal ink-jet type, or a Bubble Jet (registered trade name) type).

Of these methods, in the ink-jet recording method of this invention, recording is preferably performed on a plain paper by ejecting the ink of this invention from piezo type ink-jet recording heads having nozzles of not more than 30 μm diameter, and more preferably performed on a plain paper by ejecting the ink of the present invention from piezo type ink-jet recording heads of a line head system having nozzles of not more than 30 μm diameter. Of piezo type ink-jet recording heads, a head employing a share mode is preferred as described in, for example, Patent Document 7. This type of head can be set at a relatively high optimum ink viscosity e.g. 8-12 cP at an ordinary temperature, so that the head is suitable for the ink-jet ink of the invention containing a large amount of organic solvent. Further, since the ink-jet ink of the invention has a large amount of organic solvent whose boiling point is not less than 150° C., the ink exhibits excellent decap durability. Therefore, the ink is also suitable for printings employing line heads in which heads are arranged in line, rendering it feasible to apply the ink for a high-speed single pass printing whose driving frequency is such as 15-25 kHz.

Patent Document 7: JP-A 2001-322275

<<Recording Medium>>

Plain paper employed in the ink-jet recording method using the ink of the present invention is not particularly limited, but non-coated paper, special printing sheet paper, and non-coated paper with a thickness of 80-200 μm which is classified as a part of information sheet paper are preferable.

The plain paper of this invention is composed of chemical pulp represented by LBKP and NBKP, sizing agents, and fillers as major components, as well as, if needed, a paper-making aid, and is made by conventional methods. As a pulp material employed for the plain paper of this invention, mechanical pulp or recycled waste paper pulp may be employed in combinations of the above pulps. Further, these pulps may be employed as main components without causing any problem.

A sizing agent internally added to the plain paper of this invention includes, for example, a rosin size, AKD, alkenyl succinic anhydride, a petroleum resin size, epichlorohydrin, cationic starch, and acrylamide.

Fillers which are internally added to the plain paper of the invention include, for example, minute particle silicic acid powder, aluminum silicate, diatomaceous earth, kaolin, kaolinite, halloysite, nacrite, dickite, pyrophylite, sericite, titanium dioxide, and bentonite.

To minimize the rear surface penetration of the ink of the invention and enhance fixability of a pigment, the plain paper of the invention may incorporate water-soluble multivalent metal salts. The water-soluble multivalent metal salts are not particularly limited, and salts such as below, for example, are added: salts of metals such as aluminum, calcium, magnesium, zinc, iron, strontium, barium, nickel, copper, scandium, gallium, indium, titanium, zirconium, tin, or lead, as well as salts such as sulfates, nitrates, formates, succinates, malonates, chloroacetates, or p-toluenesulfonates.

There may be used water-soluble inorganic polymers, such as poly(aluminum chloride) as water-soluble salts of multivalent metal ions. In terms of solubility in water, those which exhibit at least 0.1 percent by weight of solubility in water are preferable, and are more preferable of solubility in water which exhibit at least 1 percent by weight.

Of these, a water-soluble salt composed of aluminum, calcium, aluminum, magnesium, or zinc are preferable, since such metal ions are colorless in the aqueous solution. Particularly preferable are aluminum chloride, aluminum sulfate, aluminum nitrate, aluminum acetate, calcium chloride, calcium sulfate, calcium nitrate, calcium acetate, magnesium sulfate, magnesium nitrate, magnesium acetate, zinc chloride, zinc sulfate, zinc nitrate, and zinc acetate.

In the invention, other than plain paper, various papers such as high-quality paper, art paper, coated paper, cast-coated paper, glossy paper, paper for ink-jet printing use are usable.

EXAMPLES

The invention is described below with reference to examples, but the invention is not limited to these. Descriptions of "parts" or "%" in examples denote "parts by weight" or "weight %" unless otherwise stated.

<<Preparations of Ink>>

[Preparation of Pigment Dispersion]

Preparation of Magenta Pigment Dispersion

Additives below were mixed, and the resultant mixture was put into a polypropylene container together with 200 g of zirconia beads having 0.5 mm diameter. The container was stoppered tightly, and the solution was dispersed over 5 hours employing a paint shaker, to prepare a magenta pigment dispersion having a magenta pigment content of 15%.

| | |
|---|---|
| C.I. Pigment Red 122 | 15 parts |
| JONCRYL 501 (produced by Johnson Polymer Corp.) (aqueous solution of 30% of solid) | 20 parts |
| 1,2-buthanediol | 60 parts |
| water | 5 parts |

[Preparation of Magenta Ink 1]

To the above Magenta Pigment Dispersion, added was water so that concentrations of the pigment and 1,2-buthanediol reached 4 weight % and 10 weight % of the ink, respectively, and the resulting mixture was sufficiently stirred. Then, Magenta Ink 1 was prepared by filtration of the mixture through a metal filter of #3500 mesh, followed by being subjected to degassing using a hollow fiber membrane.

[Preparation of Magenta Ink 2]

Magenta Ink 2 was prepared in a similar manner to preparation of Magenta Ink 1, except that the concentration of 1,2-buthanediol was changed to 60 weight %.

[Preparation of Magenta Inks 3-7 and 24-27]

Preparation of Magenta Pigment Dispersion

Additives below were mixed, and the resultant mixture was put into a polypropylene container together with 200 g of zirconia beads having 0.5 mm diameter. The container was stoppered tightly, and the solution was dispersed over 5 hours employing a paint shaker, to prepare a magenta pigment dispersion having a magenta pigment content of 15%.

| | |
|---|---|
| C.I. Pigment Red 122 | 15 parts |
| JONCRYL 501 (produced by Johnson Polymer Corp.) (aqueous solution of 30% of solid) | 20 parts |
| 1,2-buthanediol | 50 parts |
| 3-methoxy-3-methyl-butanol | 10 parts |
| water | 5 parts |

[Preparation of Magenta Ink 3]

To above Magenta Pigment Dispersion, added was water so that concentrations of the pigment, 1,2-buthanediol and 3-methoxy-3-methyl-butanol reached 4 weight %, 40 weight % and 10 weight % of the ink, respectively, and the resulting mixture was sufficiently stirred. Then, the mixture was filtered through a metal filter of #3500 mesh, followed by being subjected to degassing using a hollow fiber membrane, and thus Magenta Ink 3 was prepared.

[Preparation of Magenta Inks 4-7 and 24-27]

Magenta Inks 4-7 and 24-27 were prepared in a similar manner to preparation of Ink 3, except that the weight percents of 1,2-buthanediol and 3-methoxy-3-methyl-lbutanol were changed to the values as shown in Tables 1 and 2.

[Preparation of Magenta Ink 8]

Preparation of Magenta Pigment Dispersion

Additives below were mixed, and the resultant mixture was put into a polypropylene container together with 200 g of zirconia beads having a 0.5 mm diameter. The container was stoppered tightly, and the solution was dispersed over 5 hours employing a paint shaker, to prepare Magenta Pigment Dispersion having a magenta pigment content of 15%.

| | |
|---|---|
| C.I. Pigment Red 122 | 15 parts |
| JONCRYL 501 (produced by Johnson Polymer Corp.) (aqueous solution of 30% of solid) | 20 parts |
| 1,2-buthanediol | 50 parts |
| tripropyleneglycolmonobuthylether | 10 parts |
| water | 5 parts |

[Preparation of Ink 8]

To above Magenta Pigment Dispersion, added was water so that concentrations of the pigment, 1,2-buthanediol and tripropyleneglycolmonobuthyl ether reached 4 weight %, 60 weight % and 10 weight % of the ink respectively, and the resulting mixture was sufficiently stirred. Then, the mixture was filtered through a metal filter of #3500 mesh, followed by being subjected to degassing using a hollow fiber membrane, and thus Magenta Ink 8 was prepared.

[Preparation of Magenta Inks 9-14]

Magenta Inks 9-14 were prepared in a similar manner to preparation of Ink 5, except that 1,2-buthanediol was changed to other alkane dioles as shown in Table 1.

[Preparation of Magenta Inks 15-23]

Preparation of Magenta Pigment Dispersion

Additives below were mixed, and the resultant mixture was put into a polypropylene container together with 200 g of zirconia beads having 0.5 mm diameter. The container was stoppered tightly, and the solution was dispersed over 5 hours employing a paint shaker, to prepare Magenta Pigment Dispersion having a magenta pigment content of 15%.

| | |
|---|---|
| C.I. Pigment Red 122 | 15 parts |
| JONCRYL 501 (produced by Johnson Polymer Corp.) (aqueous solution of 30% of solid) | 20 parts |
| 1,2-buthanediol | 25 parts |
| 1,2-penthanediol | 25 parts |
| 3-methoxy-3-methyl-butanol | 10 parts |
| water | 5 parts |

[Preparation of Magenta Ink 15]

To above Magenta Pigment Dispersion, added was water so that the concentrations of the pigment, 1,2-buthanediol, 1,2-penthanediol and 3-methoxy-3-methyl-butanol reached 4 weight %, 30 weight %, 30 weight % and 10 weight % of the ink, respectively, and the resulting mixture was sufficiently stirred. Then, the mixture was filtered through a metal filter of #3500 mesh, followed by being subjected to degassing using a hollow fiber membrane, and thus Magenta Ink 15 was prepared.

[Preparation of Magenta Inks 16-23]

Preparation of Magenta Pigment Dispersion

Magenta Inks 16-23 were prepared in a similar manner to preparation of Magenta Ink 15, except that the combination of 1,2-buthanediol and 1,2-penthanediol was changed to that of alkane diols as shown in Table 2.

[Preparation of Magenta Ink 28]

Preparation of Magenta Pigment Dispersion

Additives below were mixed, and the resultant mixture was put into a polypropylene container together with 200 g of zirconia beads having 0.5 mm diameter. The container was stoppered tightly, and the solution was dispersed over 5 hours employing a paint shaker, to prepare Magenta Pigment Dispersion having a magenta pigment content of 15%.

| | |
|---|---|
| C.I. Pigment Red 122 | 15 parts |
| JONCRYL 501 (produced by Johnson Polymer Corp.) (aqueous solution of 30% of solid) | 20 parts |
| 1,2-buthanediol | 50 parts |
| 3-methoxy-butanol | 10 parts |
| water | 5 parts |

[Preparation of Magenta Ink 28]

To above Magenta Pigment Dispersion, added was water so that the concentrations of the pigment, 1,2-buthanediol and 3-methoxybutanol reached 4 weight %, 60 weight % and 10 weight % of the ink, respectively, and the resulting mixture was sufficiently stirred. Then, the mixture was filtered through a metal filter of #3500 mesh, followed by being subjected to degassing using a hollow fiber membrane, and thus Magenta Ink 28 was prepared.

[Preparation of Magenta Ink 29]

Preparation of Magenta Pigment Dispersion

Additives below were mixed, and the resultant mixture was put into a polypropylene container together with 200 g of zirconia beads having 0.5 mm diameter. The container was stoppered tightly, and the solution was dispersed over 5 hours employing a paint shaker, to prepare Magenta Pigment Dispersion having a magenta pigment content of 15%.

| | |
|---|---|
| C.I. Pigment Red 122 | 15 parts |
| JONCRYL 501 (produced by Johnson Polymer Corp.) (aqueous solution of 30% of solid) | 20 parts |
| Tripropyleneglycolmonobuthyl ether | 60 parts |
| water | 5 parts |

[Preparation of Magenta Ink 29]

To above Magenta Pigment Dispersion, added was water so that concentrations of the pigment, 1,2-buthanediol and tripropyleneglycolmonobuthyl ether reached 4 weight % and 65 weight % of the total ink weight, respectively, and the resulting mixture was sufficiently stirred. Then, the mixture was filtered through a metal filter of #3500 mesh, followed by being subjected to degassing using a hollow fiber membrane, and thus Magenta Ink 29 was prepared.

<<Evaluation of Images>>

Images were prepared employing an on-demand type inkjet printer (manufactured by Konica Minolta Co.) with a maximum recording density of 720×720 dpi using a piezo type head having a nozzle pore size of 25 μm, a driving frequency of 12 kHz, a nozzle number of 128, and a nozzle density of 180 dpi (hereinafter, dpi represents a dot number per inch, being 2.54 cm.).

[Toner Solubility]

Ten sheets of solid magenta images were printed, and were placed in piles. Another 500 sheets of solid magenta images were printed employing an electrophotographic color laser printer magicolor 7300 (manufactured by Konica Minolta Co.) and were placed in piles on the top of the above piles of ten sheets. The combined piles were stored under two different conditions of 25° C. and 60° C. for one week. After one week, the combined piles were observed to see how many electronic prints mutually adhered counted from the bottom of the piles. As a result, it was found that no print of the sample piles adhered under a condition of 25° C., but another sample piles stored under a condition of 60° C. exhibited some differences in adhesion levels among samples. Therefore, evaluation was performed with a condition of 60° C.

A: No adhesion was noted.
B: Adhesion of one print was noted.
C: Adhesion of within the range of 2-3 prints was noted.
D: Adhesion of within the range of 4-10 prints was noted.
E: Adhesion of not less than 11 prints was noted.

[Curling (at 50% R H and 85% RH)]

Sheets of solid magenta images were printed and kept stand for 3 days under two different conditions of 25° C./50% RH and 25° C./80% RH. After three days, the prints were visually observed and evaluated.

A: No curling was noted.
B: Slight curling was noted.
C: Weak curling was noted.
D: Slight stretching and strong curling were noted.
E: Definite shrinking and significantly strong curling were noted.

<<Rear Surface Penetration>>

The back surface of a solid magenta image print was visually observed and evaluated.

A: Neither ink blur nor rear surface penetration was noted on the back surface.
B: Ink blur and rear surface penetration were slightly noted on the back surface.

C: Ink blur and rear surface penetration were fairly noted on the back surface.

D: Ink blur and rear surface penetration were definitely noted on the back surface.

E: Ink blur and rear surface penetration were markedly noted on the back surface.

<<Decap Durability>>

Employing a share mode piezo type recording head (manufactured by Konica Minolta Co.) having a nozzle number of 256 with ink-jet head temperature being set at 35° C., voltage applied to the recording head was regulated so that ink droplet ejection speed was 8 m/sec. at an ejection interval of 50 miliseconds as an initial nozzle condition. Subsequently, a relative ratio of ink droplet ejection speed was determined by varying ejection interval time using a formula below. The decap durability was evaluated based on criteria below.

For example, 100 ink droplets were ejected at an ejection intervals of 50 miliseconds, and after t seconds from the initial ejection of the above ejections, another 100 ink droplets were ejected at ejection intervals of 50 miliseconds. Ink droplet ejection speed of the initial ink droplet after t seconds of ejection intervals was determined. The determined value was defined as the ink droplet ejection speed after the interval time of t seconds.

Relative ratio of ink droplet ejection speed (%)=(ink droplet ejection speed after ejection interval time of $t$ seconds)/(ink droplet ejection speed at ejection intervals of 50 miliseconds=8 m/sec.)×100

A: Ejection interval time t was not less than 10 sec, after which the relative ratio of ink droplet ejection speed decreased to not more than 70%.

B: Ejection interval time t was not less than 1 sec. and less than 10 sec., after which the relative ratio of ink droplet ejection speed decreased to not more than 70%.

C: Ejection interval time t was not less than 0.3 sec. and less than 1 sec., after which the relative ratio of ink droplet ejection speed decreased to not more than 70%.

D: Ejection interval time t was less than 0.3 sec., after which the relative ratio of ink droplet ejection speed decreased to not more than 70%.

TABLE 1

| Ink | Alkane diol represented by Formula (1) and/or (2) | | | | Glycol monoether represented by Formula (3) | | Solubilization of toner | Curling | | Rear surface penetratio | Decap durability | Note |
|---|---|---|---|---|---|---|---|---|---|---|---|---|
| | Alkane diol | *1 | Alkane diol | *1 | Glycol monoether | *1 | | 50% | 85% | | | |
| 1 | 1,2-** | 10 | — | — | — | — | A | E | E | A | C | Comp. |
| 2 | 1,2-** | 60 | — | — | — | — | A | A | E | A | B | Comp. |
| 3 | 1,2-** | 40 | — | — | MMB | 10 | A | D | E | A | B | Comp. |
| 4 | 1,2-** | 50 | — | — | MMB | 10 | A | A | A | A | A | Inv. |
| 5 | 1,2-** | 60 | — | — | MMB | 10 | A | A | A | A | A | Inv. |
| 6 | 1,2-** | 70 | — | — | MMB | 10 | A | A | A | A | A | Inv. |
| 7 | 1,2-** | 75 | — | — | MMB | 10 | A | A | B | E | A | Comp. |
| 8 | 1,2-** | 60 | — | — | TPGMBE | 10 | A | A | C | A | A | Comp. |
| 9 | 1,3-** | 60 | — | — | MMB | 10 | A | A | A | A | B | Inv. |
| 10 | 1,4-** | 60 | — | — | MMB | 10 | A | C | D | A | B | Comp. |
| 11 | 2,3-** | 60 | — | — | MMB | 10 | A | A | A | A | B | Inv. |
| 12 | 1,2-pentadiol | 60 | — | — | MMB | 10 | A | A | A | A | A | Inv. |
| 13 | 1,5-pentadiol | 60 | — | — | MMB | 10 | A | C | D | A | B | Comp. |
| 14 | 1,2-hexanediol | 60 | — | — | MMB | 10 | A | A | A | A | A | Inv. |
| 15 | 1,2-** | 30 | 1,2-pentadiol | 30 | MMB | 10 | A | A | A | A | A | Inv. |

**buthanediol,
*1: weight %
TPGMBE: tripropylene glycol monobuthyl ether,
MMB: 3-methoxy-3-methylbutanol
Comp.: Comparative Example,
Inv.: Present Invention

TABLE 2

| Ink | Alkane diol represented by Formula (1) and/or (2) | | | | Glycol monoether represented by Formula (3) | | Solubilization of toner | Curling | | Rear surface penetratio | Decap durability | Note |
|---|---|---|---|---|---|---|---|---|---|---|---|---|
| | Alkane diol | *1 | Alkane diol | *1 | Glycol monoether | *1 | | 50% | 85% | | | |
| 16 | 1,2-** | 30 | 1,2-hexanediol | 30 | MMB | 10 | A | A | A | A | A | Inv. |
| 17 | 1,2-** | 30 | 1,3-** | 30 | MMB | 10 | A | A | A | A | B | Inv. |
| 18 | 1,2-** | 30 | 2,3-** | 30 | MMB | 10 | A | A | A | A | B | Inv. |

TABLE 2-continued

| Ink | Alkane diol represented by Formula (1) and/or (2) Alkane diol | *1 | Alkane diol | Glycol monoether represented by Formula (3) Glycol monoether | *1 | Solubilization of toner | Curling 50% | Curling 85% | Rear surface penetratio | Decap durability | Note |
|---|---|---|---|---|---|---|---|---|---|---|---|
| 19 | 1,3-** | 30 | 2,3-** | MMB | 10 | A | A | A | A | B | Inv. |
| 20 | 1,3-** | 30 | 1,2-pentadiol | MMB | 10 | A | A | A | A | B | Inv. |
| 21 | 1,3-** | 30 | 1,2-hexanediol | MMB | 10 | A | A | A | A | B | Inv. |
| 22 | 2,3-** | 30 | 1,2-pentadiol | MMB | 10 | A | A | A | A | B | Inv. |
| 23 | 2,3-** | 30 | 1,2-hexanediol | MMB | 10 | A | A | A | A | B | Inv. |
| 24 | 1,2-** | 60 | — | MMB | 4 | A | A | C | A | A | Comp. |
| 25 | 1,2-** | 60 | — | MMB | 5 | A | A | A | A | A | Inv. |
| 26 | 1,2-** | 60 | — | MMB | 15 | A | A | A | A | A | Inv. |
| 27 | 1,2-** | 60 | — | MMB | 16 | C | A | A | A | A | Comp. |
| 28 | 1,2-** | 60 | — | MB | 10 | A | B | A | A | A | Comp. |
| 29 | TPGMBE | 65 | — | — | — | C | A | A | A | A | Comp. |

**buthanediol,
*1: Percent by mass
TPGMBE: tripropyleneglycolmonobuthylether,
MMB: 3-methoxy-3-methylbutanol
Comp.: Comparative Example,
Inv.: Present Invention Tables 1 and 2 show that the ink for ink-jet recording of the present invention prevents rear surface penetration, does not cause mutual adhesion of electrophotographic prints even when ink-jet prints and electrophotographic prints are stored in piles, and in addition to the above, suppresses curling of print under high-humidity condition.

What is claimed is:

1. An ink-jet ink comprising at least water and an organic solvent having a boiling point of not less than 150° C. in an amount of not less than 50 weight % and not more than 80 weight % based on the total weight of the ink, wherein the organic solvent comprises an alkane diol represented by Formula (1) or (2) in an amount of not less than 45 weight % and not more than 70 weight % based on the total weight of the ink, and a glycol mono-ether represented by Formula (3) in an amount of not less than 5 weight % and not more than 15 weight % based on the total weight of the ink:

$$R_1\text{—CH(OH)—CH(OH)—}R_2 \qquad \text{Formula (1)}$$

wherein $R_1$ is a hydrogen atom or a methyl group, $R_2$ is a hydrogen atom, a methyl group, an ethyl group, or a propyl group;

$$R_1\text{—CH(OH)—CH}_2\text{—CH(OH)—}R_2 \qquad \text{Formula (2)}$$

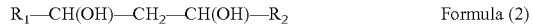

wherein $R_1$ is a hydrogen atom or a methyl group, $R_2$ is a hydrogen atom, a methyl group, an ethyl group, or a propyl group;

$$CH_3\text{—O—}R_3\text{—OH} \qquad \text{Formula (3)}$$

wherein $R_3$ is a branched-chain bivalent saturated hydrocarbon group.

2. The ink-jet ink described in claim 1,
wherein the alkane diol represented by Formula (1) or (2) is selected from 1,2-butanediol, 1,2-pentanediol, and 1,2-hexanediol; and the glycol mono-ether represented by Formula (3) is 3-methoxy-3-methyl-butanol.

3. An ink-jet ink comprising at least water and an organic solvent having a boiling point of not less than 150° C. in an amount of not less than 50 weight % and not more than 80 weight % based on the total weight of the ink, wherein the organic solvent comprises an alkane diol represented by Formula (1) or (2) in an amount of not less than 45 weight % and not more than 70 weight % based on the total weight of the ink and a glycol mono-ether represented by Formula (3) in an amount of not less than 5 weight % and not more than 15 weight % based on the total weight of the ink:

$$R_1\text{—CH(OH)—CH(OH)—}R_2 \qquad \text{Formula (1)}$$

wherein $R_1$ is a hydrogen atom or a methyl group, $R_2$ is a hydrogen atom, a methyl group, or an ethyl group;

$$R_1\text{—CH(OH)—CH}_2\text{—CH(OH)—}R_2 \qquad \text{Formula (2)}$$

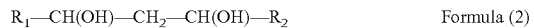

wherein $R_1$ is a hydrogen atom or a methyl group, $R_2$ is a hydrogen atom, a methyl group, or an ethyl group;

$$CH_3\text{—O—}R_3\text{—OH} \qquad \text{Formula (3)}$$

wherein $R_3$ is a branched-chain bivalent saturated hydrocarbon group.

* * * * *